(12) United States Patent
Shim

(10) Patent No.: US 6,757,806 B2
(45) Date of Patent: Jun. 29, 2004

(54) METHOD FOR CONVERTING ADDRESSES IN A SEMICONDUCTOR MEMORY DEVICE AND APPARATUS THEREFOR

(75) Inventor: Jae Wook Shim, Seoul (KR)

(73) Assignee: Hynix Semiconductor Inc., Kyoungki-do (KR)

(*) Notice: Subject to any disclaimer, the term of this patent is extended or adjusted under 35 U.S.C. 154(b) by 249 days.

(21) Appl. No.: 10/034,385

(22) Filed: Dec. 27, 2001

(65) Prior Publication Data

US 2003/0056079 A1 Mar. 20, 2003

(30) Foreign Application Priority Data

Sep. 20, 2001 (KR) ........................................ 2001-58145

(51) Int. Cl.[7] .............................................. G06F 12/08
(52) U.S. Cl. ........................ 711/203; 711/206; 711/207
(58) Field of Search ................................ 711/203, 206, 711/207

(56) References Cited

U.S. PATENT DOCUMENTS

| | | |
|---|---|---|
| 5,652,860 A | 7/1997 | Sato |
| 5,844,914 A | 12/1998 | Kim et al. |
| 5,848,247 A | 12/1998 | Matsui et al. |
| 6,049,844 A | 4/2000 | Matsui et al. |
| 6,148,388 A | 11/2000 | Wu et al. |
| 6,477,632 B1 * | 11/2002 | Kikuchi ................ 711/203 |
| 2001/0056517 A1 * | 12/2001 | Hataida et al. ............. 711/3 |

FOREIGN PATENT DOCUMENTS

JP          7281948        10/1995

* cited by examiner

Primary Examiner—Mano Padmanabhan
Assistant Examiner—Midys Inoa
(74) Attorney, Agent, or Firm—Ladas & Parry

(57) ABSTRACT

An apparatus for and a method of converting an address in a semiconductor memory device sequentially performing a data write operation on addresses from an upper address, by performing a write or read operation after converting inputted logical addresses into physical addresses in a memory device by using an address converting table. As a result, an operation speed of the system is improved and power consumption is reduced. The apparatus for converting the address in the semiconductor memory device includes: an address converting unit for receiving a logical address indicating a write address, an invalid logical address indicating an address having an invalid data in a logical memory, an address renewing signal notifying renewal of a changed address map between the logical memory and a physical memory, and an address map signal updated to the physical memory, converting the received logical addresses into physical addresses, sequentially storing data in the converted physical addresses from a most significant physical address which can input data, storing the logical addresses and the physical addresses to be equalized, erasing invalid data of the logical address according to the invalid logical address, and converting the logical addresses received in a read operation into the physical addresses stored in a write operation to perform a data read operation; an address decoder unit for receiving the physical addresses from the address converting unit and an external control signal, and generating a decoded signal; and a plurality of memory block units for reading or writing data from/on a selected memory cell according to the signal from the address decoder unit.

8 Claims, 5 Drawing Sheets

FIG.2A
(PRIOR ART)

Physical memory

| Physical address | data |
|---|---|
| 0 | *1 |
| 1 | $1 |
| 2 | &1 |
| 3 | &2 |
| 4 | @1 |
| 5 | @2 |
| 6 | %1 |
| 7 | %2 |
| 8 | |
| 9 | |
| A | |
| .... | .... |

→

Physical memory

| Physical address | data |
|---|---|
| 0 | *1 |
| 1 | Invalidata |
| 2 | &1 |
| 3 | &2 |
| 4 | Invalidata |
| 5 | Invalidata |
| 6 | %1 |
| 7 | %2 |
| 8 | |
| 9 | |
| A | |
| .... | .... |

FIG.2B
(PRIOR ART)

Physical memory

| Physical address | data |
|---|---|
| 0 | *1 |
| 1 | |
| 2 | &1 |
| 3 | &2 |
| 4 | |
| 5 | |
| 6 | %1 |
| 7 | %2 |
| 8 | |
| 9 | |
| A | |
| .... | .... |

New data

| |
|---|
| #1 |
| #2 |
| #3 |

→

Physical memory

| Physical address | data |
|---|---|
| 0 | *1 |
| 1 | |
| 2 | &1 |
| 3 | &2 |
| 4 | |
| 5 | |
| 6 | %1 |
| 7 | %2 |
| 8 | #1 |
| 9 | #2 |
| A | #3 |
| .... | .... |

| |
|---|
| #1 |
| #2 |
| #3 |

METHOD FOR CONVERTING ADDRESSES IN A SEMICONDUCTOR MEMORY DEVICE AND APPARATUS THEREFOR

BACKGROUND OF THE INVENTION

1. Field of the Invention

The present invention relates generally to a method for converting an address in a semiconductor memory device and an apparatus therefor, and in particular to a method for converting an address in a semiconductor memory device and an apparatus therefor which can sequentially perform a data write operation on addresses from an upper address, by performing a write or read operation after converting inputted logical addresses into physical addresses in a memory device by using an address converting table.

2. Description of the Background Art

FIG. 1 is a structure diagram illustrating a conventional semiconductor memory device including: an address decoder unit 1 for externally receiving a control signal CTL and an address signal ADD_ext; and a plurality of memory block units M0-Mn for reading or writing data from/on a selected memory cell according to the output signal from the address decoder unit 1.

In the conventional structure of FIG. 1, the address ADD_ext externally inputted to the memory is an actual physical address of the memory. Accordingly, when the data written from the most significant address is invalidated (erased, namely the data are not erased from the memory, but the data of the used memory region are classified into valid ones, and thus new data can be overwritten), an empty space exists between the valid data as shown in FIG. 2a. Here, a process for writing new data and invalidating the data is repeated to separately store data of the memory in a few memory blocks from the most significant address to the least significant address.

As depicted in FIG. 3, when a data to be newly written is greater than the empty space between the data blocks, the new data is written in the empty space of the lower address. In the memory region, only small regions for storing small data are empty due to the repeated process for writing and invalidating the data.

In order to use such small spaces, when writing new data, a software or memory controller for operating the memory must separate one data block into a few strips and store the data in the divided strips, or re-store the data previously stored in the memory together to obtain a space and store the new data in the obtained space.

However, in the conventional semiconductor memory device, when the software or memory controller divides one data block into a few strips to write the new data, a data dividing structure is further required. As a result, the whole system requires complicated processing and operation speed is reduced. On the other hand, when the software or memory controller re-stores the previously-stored data together to obtain a space and stores the new data in the resulting "free" space, operation speed is decreased.

SUMMARY OF THE INVENTION

Accordingly, it is a primary object of the present invention to provide a method of converting an address in a semiconductor memory device and an apparatus therefor which can improve system speed and reduce power consumption, by performing a write or read operation on a memory after converting externally-inputted logical addresses into physical addresses through an address converting table of an address input terminal, namely by enabling a software operating the memory to finish the data storing operation merely by making the memory renew the address converting table, and by accessing the memory with the physical addresses, instead of the logical addresses.

Another object of the present invention is to provide a method for converting an address in a semiconductor memory device and an apparatus therefor, which can efficiently manage power consumption, by aligning data stored in a memory in an upper memory, and intercepting the power of non-used memory blocks.

In order to achieve the above-described objects of the invention, there is provided a method of converting an address in a semiconductor memory device having an address converting table for converting logical addresses into physical addresses, including: a write operation step for converting inputted logical addresses into physical addresses in the address converting table, sequentially storing data in the converted physical addresses from an upper address, and storing the logical addresses and the physical addresses in the table to be equalized; an invalid data erasing step for receiving a logical address of an invalid data, and erasing the logical address from the address converting table; a read operation step for converting the inputted logical addresses into the physical addresses stored in a write operation in the address converting table, and reading data; and a logical address re-allocation step for re-allocating the logical addresses to obtain a memory space in a software using a memory, loading a re-allocated address map to the address converting table after re-allocating the logical addresses, and renewing the table.

In one aspect of the present invention, in the step for converting the logical addresses into the physical addresses, a most significant address usable in the memory is allocated in the write operation, the physical address converting result is stored in the address converting table, and the physical address converted in the write operation is detected and outputted from the table in regard to the logical address inputted in the read operation.

In another aspect of the present invention, the method for converting the address in the semiconductor memory device further includes a power control step for discriminating between a using or non-using state of the memory blocks according to the physical address information from the address converting table, and for applying or intercepting power according to the discrimination result so as to reduce power consumption.

In still another aspect of the present invention, the method for converting the address in the semiconductor memory device further includes a power control step for discriminating between a using or non-using state of the memory blocks by employing a register notifying data existence or absence in the respective memory blocks, and for applying or intercepting power according to the discrimination result so as to reduce power consumption.

There is also provided an apparatus for converting an address in a semiconductor memory device, including: an address converting unit for receiving a logical address indicating a write address, an invalid logical address indicating an address having an invalid data in a logical memory, an address renewing signal notifying renewal of a changed address map between the logical memory and a physical memory, and an address map signal updated to the physical memory, converting the received logical addresses into physical addresses, sequentially storing data in the converted physical addresses from a most significant physical address which can input data, storing the logical addresses and the physical addresses to be equalized, erasing invalid data of the logical address according to the invalid logical address, and converting the logical addresses received in a read operation into the physical addresses stored in a write operation to perform a data read operation.

In one aspect of the present invention, the address converting unit re-allocates the logical addresses, loads a re-allocated address map to the address converting table after re-allocating the logical addresses, and renews the table.

In another aspect of the present invention, the apparatus for converting the address in the semiconductor memory device further includes: a power control unit for discriminating a using or non-using state of memory blocks according to the physical address information from the address converting table, and for applying or intercepting power according to the discrimination result to reduce power consumption.

In addition, there is provided an apparatus for converting an address in a semiconductor memory device, including: an address converting unit for receiving a logical address indicating a write address, an invalid logical address indicating an address having an invalid data in a logical memory, an address renewing signal notifying renewal of a changed address map between the logical memory and a physical memory, and an address map signal updated to the physical memory, converting the received logical addresses into physical addresses, sequentially storing data in the converted physical addresses from a most significant physical address which can input data, storing the logical addresses and the physical addresses to be equalized, erasing invalid data of the logical address according to the invalid logical address, and converting the logical addresses received in a read operation into the physical addresses stored in a write operation to perform a data read operation; an address decoder unit for receiving the physical addresses from the address converting unit and an external control signal, and generating a decoded signal; and a plurality of memory block units for reading or writing data from/on a selected memory cell according to the signal from the address decoder unit.

BRIEF DESCRIPTION OF THE DRAWINGS

The present invention will become better understood with reference to the accompanying drawings, which are given only by way of illustration and thus are not limitative of the present invention, wherein:

FIG. 2a is a table showing a state where a specific data of a memory is invalidated in the conventional semiconductor memory device;

FIG. 2b is a table showing a state where, when a new data is inputted in the conventional semiconductor memory device, an empty space of an upper address region is smaller than the inputted data, and thus the data is recorded in an address of a lower address region;

DETAILED DESCRIPTION OF THE PREFERRED EMBODIMENTS

Figure 1:
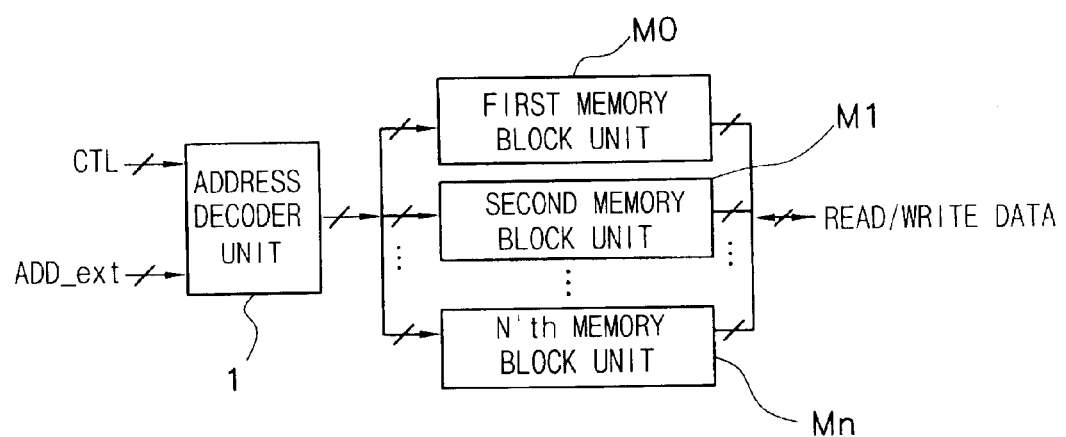
FIG. 1 is a block diagram illustrating a conventional semiconductor memory device.

A method for converting an address in a semiconductor memory device and an apparatus therefor in accordance with preferred embodiments of the present invention will now be described in detail with reference to the accompanying drawings.

In the following description, same drawing reference numerals are used for the same elements for different drawings, and explanations of those elements will be omitted.

Figure 3:
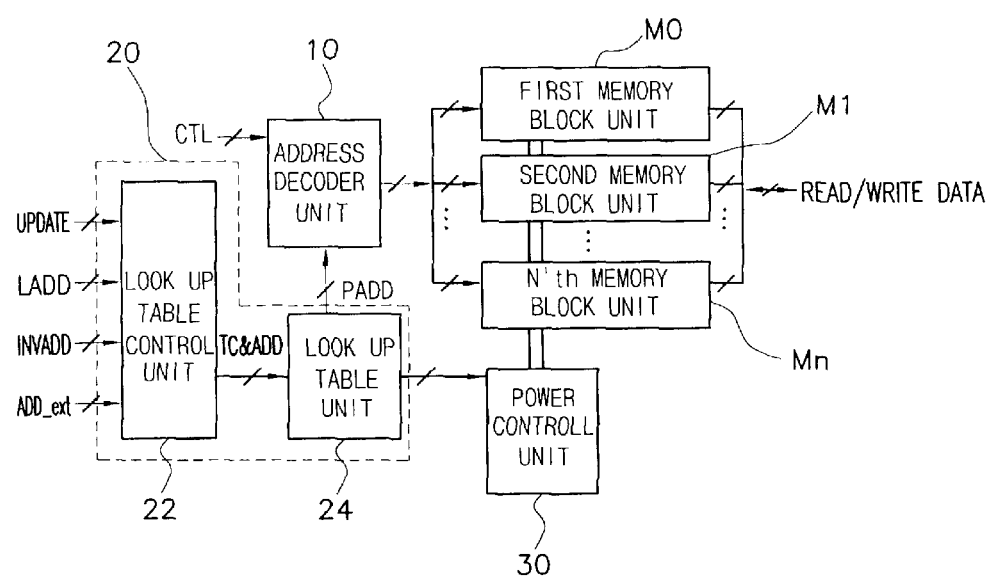
FIG. 3 is a block diagram illustrating a semiconductor memory device having an address converting table in accordance with the present invention.

FIG. 3 is a block diagram illustrating the semiconductor memory device in accordance with the present invention. The semiconductor memory device includes: a plurality of memory block units Mn; an address decoder unit 10; an address converting unit 20 having a lookup table control unit 22 and a lookup table unit 24; and a power control unit 30.

The lookup table control unit 22 of the address converting unit 20 receives an external logical address ADD_ext, an invalid logical address INVADD, a signal UPDATA notifying renewal of a changed address map to a memory, and an address map signal LADD updated to a logical address table, and generates a table control signal TC and an address ADD to the lookup table unit 24.

The lookup table unit 24 of the address converting unit 20 receives the table control signal TC and the address ADD from the lookup table control unit 22, and generates a physical address PADD sent to the address decoder unit 10.

The address converting unit 20 converts the externally-received logical address (write address) ADD_ext into a physical address, sequentially stores data in the physical addresses from a most significant physical address which can input data, and stores the received logical addresses ADD_ext and the converted physical addresses to be equalized. In addition, the address converting unit 20 receives and erases the invalid logical address INVADD.

In the read operation, the received logical address (read address) ADD_ext is converted into the physical address stored in the write operation by the address converting unit 20, thereby reading the data.

In the re-allocation of the logical addresses, the software using the memory re-allocates the logical addresses to obtain a memory space. After the re-allocation of the logical addresses, the re-allocated address map is loaded to the address converting unit 20, thereby renewing the table.

The address decoder unit 10 receives an external control signal CTL and the physical address signal PADD from the address converting unit 20, and generates a decoded signal to the memory block unit Mn.

The memory block units Mn read or write data from/on a selected memory cell according to the signal from the address decoder unit 10.

The power control unit 30 receives the physical address information form the address converting unit 20, discriminates between a using/non-using state of the memory block unit Mn, and applies or intercepts power according to the discrimination result, thereby minimizing power consumption.

The operation of the semiconductor memory device in accordance with the present invention will now be explained.

First, the logical address ADD_ext externally received in the write operation is stored in the address converting unit 20 of the address input terminal. The address converting unit 20 converts the received logical address ADD_ext into a physical address, and stores the data in the converted physical address.

The address converting unit 20 stores the logical address of the written data and the physical address. The logical address received in the read operation is converted into the physical address in the address converting unit 20, thereby reading the data.

When the write address (logical address) is inputted, the address converting unit 20 outputs the most significant address from the usable physical addresses. When the physical address exists in the form of valid data, the most significant address includes the physical address. That is, the data to be stored in a physical memory is always optimized in the upper address, and thus the memory space is maximally managed.

FIG. 4 is a table showing examples of mapping the logical address to the physical address through the address converting unit 20 in accordance with the present invention. A software or operating system (abbreviated herein as 'software') using a memory includes an internally-used address map of the memory. The logical memory of FIG. 4 indicates addresses recognized by the software and stored data. For reference, the software using the conventional memory performs a write or read operation on the memory by using the address map of the physical memory.

Figure 4A:
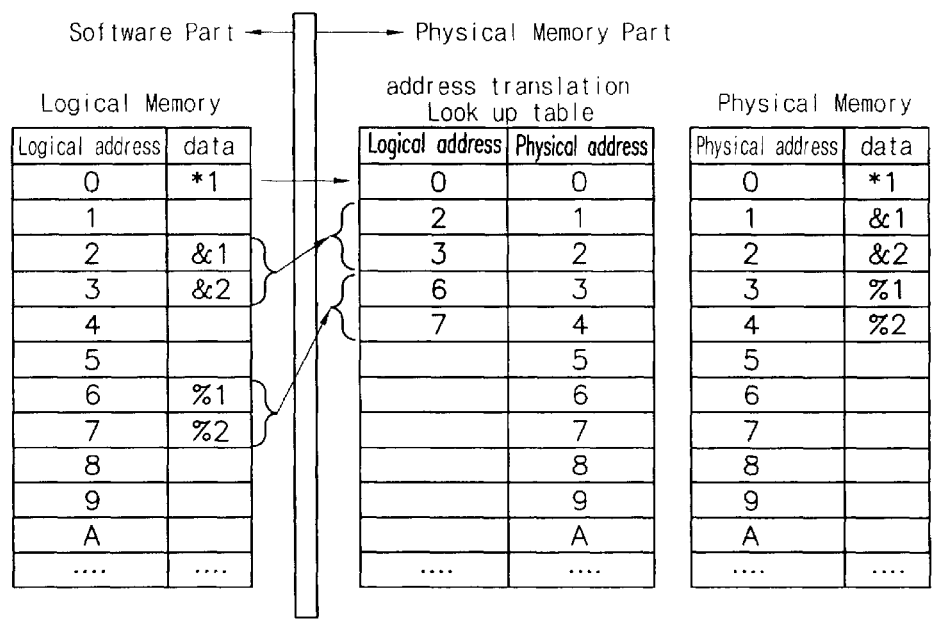
FIG. 4a is a table showing examples of allocating addresses of a logical memory to addresses of a physical memory through the address converting table in accordance with the present invention.

FIG. 4a is a table showing examples of allocating addresses of the logical memory to addresses of the physical memory through the address converting unit 20 in accordance with the present invention. Referring to FIG. 4a, three data blocks stored in the logical addresses 0, 2–3 and 8-A are sequentially stored in the physical memory through the address converting unit 20.

Figure 4B:
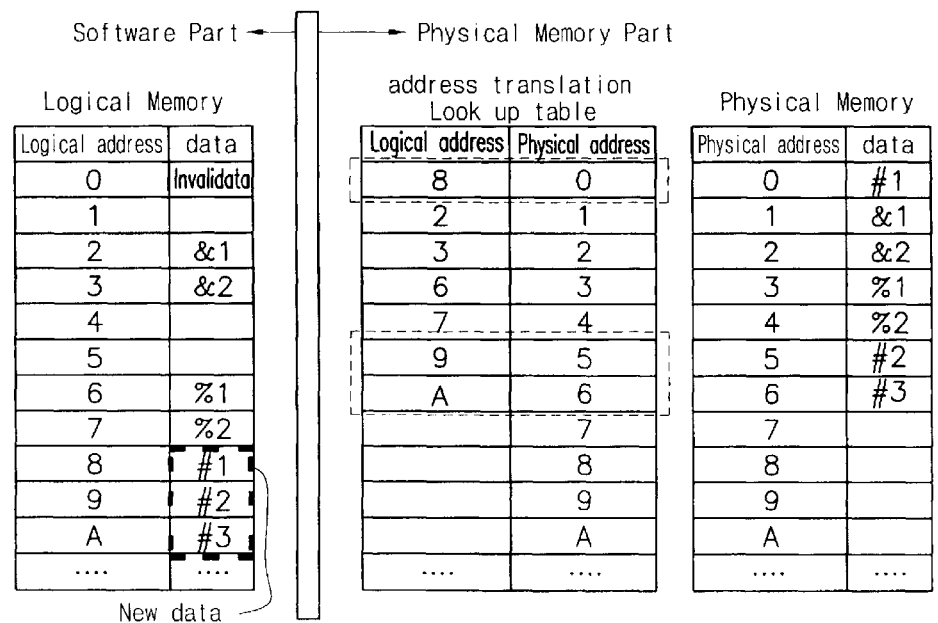
FIG. 4b is a table showing address conversion of the logical memory and the physical memory, when a data of 0-th address is invalidated in the memory and a new data is inputted thereto in accordance with the present invention.

FIG. 4b is a table showing address conversion of the logical memory and the physical memory, when a data of 0-th address is invalidated in the memory and a new data is inputted thereto (overwritten) in accordance with the present invention. Here, the data stored in the logical address 0 is invalid data, and the new data is written in the logical address 8-A.

As illustrated in FIG. 4b, since the software intends to store the data in consecutive addresses, the data is not written in the logical addresses 0–1 or 4–5, but in the logical address 8-A. The address converting unit 20 allocates the physical addresses 0 and 5–6 that are the most significant empty addresses, and sequentially stores the data. However, it is recognized that the data are separately stored in the logical memory. That is, since the software recognizes only the logical memory, if a new data is intended to be written in the memory, the data may not be written even in the sufficient space of the memory. In this case, the software re-allocates the address spaces of the logical memory. Here, the address map of the software is modified, but the read or write operation is not performed in the physical memory. After modifying the address map, the address map of the logical memory is not identical to the address map of the address converting unit 20, and thus a synchronization process must be performed. At this time, the signal UPDATA notifying the renewal of the changed address map to the memory and the updated address map are transmitted to the logical address table, thereby executing synchronization.

Figure 5:
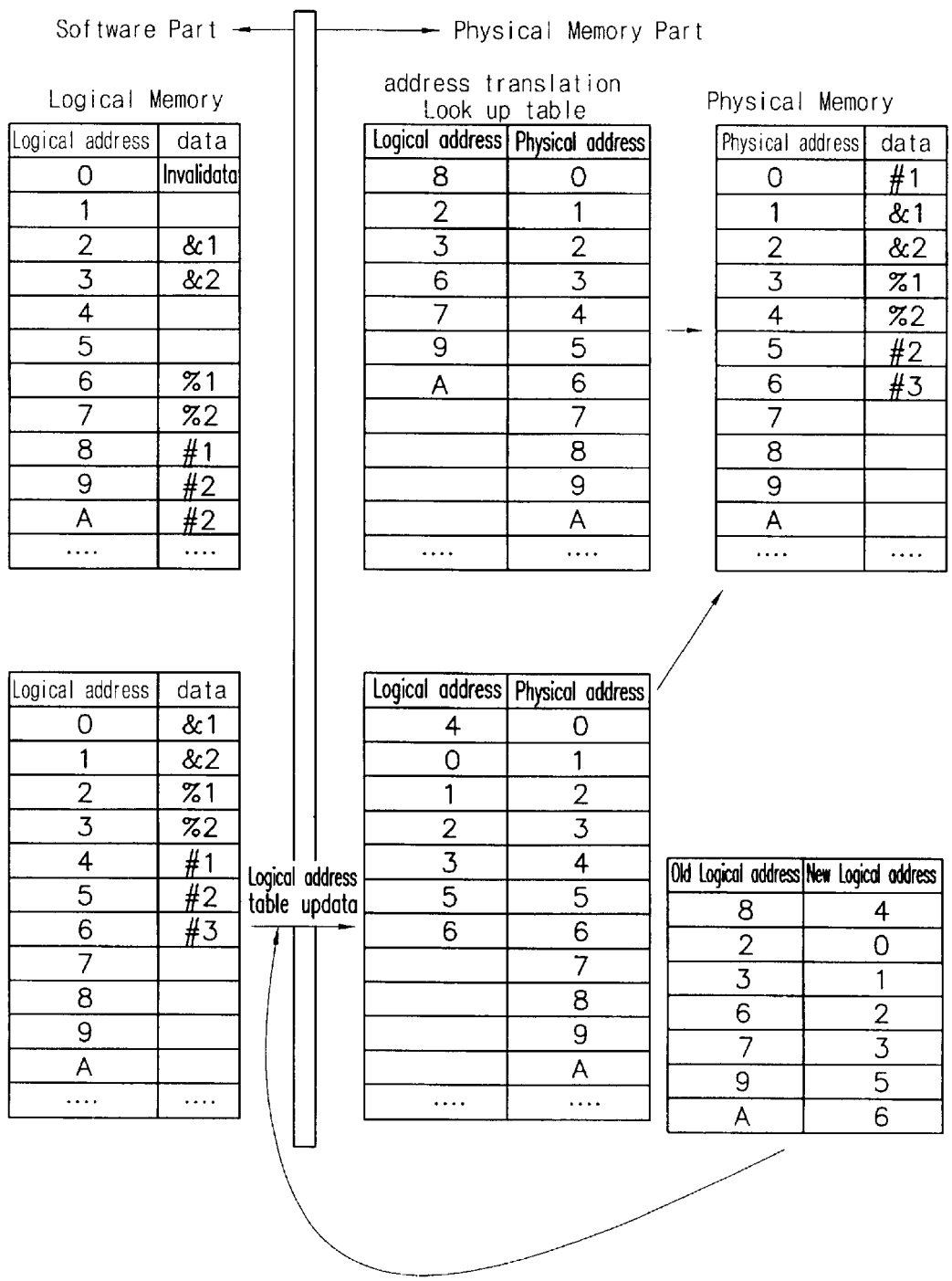
FIG. 5 is a table showing address re-allocation and synchronization of the memory in accordance with the present invention.

FIG. 5 is a table showing the address re-allocation and synchronization of the memory in accordance with the present invention.

The software internally performs the re-allocation of the logical addresses, and loads the result to the address converting unit 20, thereby renewing the table. As shown in FIG. 5, the actual addresses of the physical memory are not varied.

Although the memory of the present invention repeatedly performs the write or invalidation operation, the data are always stored in the most significant address region, in contradistinction from a conventional memory structure. When the data stored in the memory is increased, the data is filled in the memory blocks of the upper address region, and the memory blocks of the lower address region are left empty. For example, when 0–3, 4–7 and 8-B of the physical memory of FIG. 4a respectively indicate addresses of the memory blocks 0, 1 and 2, the data exist in 0–4, and thus the memory blocks 2, 3, . . . , n are empty. The power is applied to the memory blocks 0–2 or 0–3 to prepare for a new data write operation, and intercepted in the memory blocks 3-n or 4-n of the lower address region, which does not influence the operation. In the new data write operation, the power is applied to the memory blocks of the lower address region in advance according to the data amount, so that the succeeding write operation can be smoothly performed. For the power control, the semiconductor memory device of the present invention includes the power control unit 30.

The power control unit 30 receives the physical address data, which are not used in the address converting unit 20, and intercepts the power of the non-used memory blocks, thereby optimizing power consumption. However, when the address converting unit 20 is not provided, the power of the non-used memory blocks is intercepted by using a register (one bit per memory block) indicating data existence or absence in the memory blocks, to reduce power consumption.

As discussed above, in accordance with the present invention, the method for converting the address in the semiconductor memory device and the apparatus therefor can improve system speed and minimize power consumption, by performing the write or read operation on the memory after converting the externally-inputted logical addresses into the physical addresses through the address converting unit 20, namely by enabling the software operating the memory to finish the data storing operation merely by making the memory renew the address converting table, by accessing the memory with the physical addresses instead of the logical addresses.

Moreover, the method for converting the address in the semiconductor memory device and the apparatus therefor can efficiently manage power consumption, by aligning the stored data in the upper memory, and intercepting the power of the non-used memory blocks.

As the present invention may be embodied in several forms without departing from the spirit or essential characteristics thereof, it should also be understood that the above-described embodiment is not limited by any of the details of the foregoing description, but rather should be construed broadly within its spirit and scope as defined in, and limited only by, the appended claims, and therefore all changes and modifications that fall within the metes and bounds of the claims, or equivalences of such metes and bounds are therefore intended to be embraced by the appended claims.

What is claimed is:

1. A method for converting an address in a semiconductor memory device having an address converting table for converting logical addresses into physical addresses, comprising:

a write operation step for converting inputted logical addresses into physical addresses in the address converting table, sequentially storing data in the converted physical addresses from an upper address, and storing the logical addresses and the physical addresses in the table to be equalized;

an invalid data erasing step for receiving a logical address of invalid data, and erasing the logical address from the address converting table;

a read operation step for converting inputted logical addresses into the physical addresses stored in a write operation in the address converting table, and reading data;

a logical address re-allocation step for re-allocating the logical addresses to obtain memory space in software using a memory, loading a re-allocated address map to the address converting table after re-allocating the logical addresses, and renewing the table;

a power control step for discriminating between a using or non-using state of the memory blocks according to the physical address information from the address converting table, and for applying or intercepting power according to the discrimination result to reduce power consumption.

2. The method according to claim 1, wherein, in the step for converting the logical addresses into the physical addresses, a most significant address usable in the memory is allocated during the write operation, the physical address converting result is stored in the address converting table, and the physical address converted in the write operation is detected and outputted from the table in regard to the logical address inputted in the read operation.

3. The method according to claim 1, further comprising a power control step for discriminating between a using or non-using state of the memory blocks by employing a register notifying data existence or absence in the respective memory blocks, and for applying or intercepting power according to the discrimination result so as to reduce power consumption.

4. An apparatus for converting an address in a semiconductor memory device, comprising:

an address converting unit for receiving a logical address indicating a write address, an invalid logical address indicating an address having invalid data in a logical memory, an address renewing signal notifying renewal of a changed address map between the logical memory and a physical memory, and an address map signal updated to the physical memory, converting the received logical addresses into physical addresses, sequentially storing data in the converted physical addresses from a most significant physical address which can input data, storing the logical addresses and the physical addresses to be equalized, erasing invalid data of the logical address according to the invalid logical address, and converting the logical addresses received in a read operation into the physical addresses stored in a write operation to perform a data read operation; and a power control unit for discriminating between a using or non-using state of memory blocks according to the physical address information from the address converting unit, and for applying or intercepting power according to the discrimination result so as to reduce power consumption.

5. The apparatus according to claim 4, wherein the address converting unit re-allocates the logical addresses, loads a re-allocated address map to the address converting table after re-allocating the logical addresses, and renews the table.

6. An apparatus for converting an address in a semiconductor memory device, comprising:

an address converting unit for receiving a logical address indicating a write address, an invalid logical address indicating an address having invalid data in a logical memory, an address renewing signal notifying renewal of a changed address map between the logical memory and a physical memory, and an address map signal updated to the physical memory, converting the received logical addresses into physical addresses, sequentially storing data in the converted physical addresses from a most significant physical address which can input data, storing the logical addresses and the physical addresses to be equalized, erasing invalid data of the logical address according to the invalid logical address, and converting the logical addresses received in a read operation into the physical addresses stored in a write operation to perform a data read operation;

an address decoder unit for receiving the physical addresses from the address converting unit and an external control signal, and generating a decoded signal;

a plurality of memory block units for reading or writing data from/on a selected memory cell according to the signal from the address decoder unit; and a power control unit for discriminating between a using or non-using state of the memory blocks according to the physical address information from the address converting unit, and for applying or intercepting power to or from the memory block units according to the discrimination result to reduce power consumption.

7. The apparatus according to claim 6, wherein the address converting unit re-allocates the logical addresses, loads a re-allocated address map to the address converting table after re-allocating the logical addresses, and renews the table.

8. The apparatus according to claim 6, further comprising a power control unit for discriminating between a using or non-using state of the memory blocks by using a register indicating data existence or absence in the memory block units, and for applying or intercepting power to/from the memory block units according to the discrimination result so as to reduce power consumption.

* * * * *